United States Patent
Chiba et al.

(10) Patent No.: US 8,820,750 B2
(45) Date of Patent: Sep. 2, 2014

(54) INTERNAL COMBUSTION ENGINE OIL RING

(75) Inventors: Atsushi Chiba, Saitama (JP); Kazuhiro Fujimura, Saitama (JP); Iwao Hiraishi, Saitama (JP); Makoto Kajiwara, Saitama (JP)

(73) Assignee: Nippon Piston Ring Co., Ltd., Saitama (JP)

( * ) Notice: Subject to any disclaimer, the term of this patent is extended or adjusted under 35 U.S.C. 154(b) by 0 days.

(21) Appl. No.: 13/697,957

(22) PCT Filed: Mar. 31, 2011

(86) PCT No.: PCT/JP2011/058335
§ 371 (c)(1),
(2), (4) Date: Dec. 7, 2012

(87) PCT Pub. No.: WO2011/152114
PCT Pub. Date: Dec. 8, 2011

(65) Prior Publication Data
US 2013/0181410 A1  Jul. 18, 2013

(30) Foreign Application Priority Data

Jun. 4, 2010 (WO) .................. PCT/JP2010/059558

(51) Int. Cl.
*F16J 9/20* (2006.01)
*F16J 9/12* (2006.01)
*F16J 9/26* (2006.01)
*B23P 15/06* (2006.01)
*F16J 9/06* (2006.01)

(52) U.S. Cl.
CPC .... *F16J 9/20* (2013.01); *F16J 9/26* (2013.01); *B23P 15/06* (2013.01); *F16J 9/062* (2013.01)
USPC ........................................... 277/443; 277/460

(58) Field of Classification Search
USPC ................. 277/440–444, 449–455, 435, 460; 148/226
See application file for complete search history.

(56) References Cited

U.S. PATENT DOCUMENTS 2,905,512 A * 9/1959 Anderson ...................... 277/442
3,435,502 A * 4/1969 Morgan et al. ........... 29/888.074
(Continued)

FOREIGN PATENT DOCUMENTS

JP  2002-310001  10/2002
JP  2002-323133  11/2002
(Continued)

OTHER PUBLICATIONS

International Search Report, PCT/JP2011/058335, Jun. 7, 2011.

*Primary Examiner* — Vishal Patel
*Assistant Examiner* — Stacy Warren
(74) *Attorney, Agent, or Firm* — Young & Thompson

(57) ABSTRACT

A high-quality internal combustion engine oil ring which stably keeps oil consumption low for a long period and in which the shapes of an upper rail and a lower rail can be formed at low cost with high accuracy. The internal combustion engine oil ring has a recessed stepped portion formed at a corner of a sliding surface of an outer peripheral sliding projection in sliding contact with a cylinder inner wall surface of at least one of a first rail and a second rail constituting an oil ring main body, in a shape in vertical cross-section along a sliding direction of the first rail and second rail, and a wall surface of the recessed stepped portion has an arcuate surface having a radius of curvature of 0.02 mm to 0.08 mm.

20 Claims, 7 Drawing Sheets

(56) References Cited

U.S. PATENT DOCUMENTS

| | | | | |
|---|---|---|---|---|
| 4,497,497 A | * | 2/1985 | Berti et al. | 277/463 |
| 5,295,696 A | * | 3/1994 | Harayama et al. | 277/443 |
| 5,820,131 A | * | 10/1998 | Tanaka et al. | 277/442 |
| 7,077,402 B2 | * | 7/2006 | Katumaru et al. | 277/434 |
| 7,117,594 B2 | | 10/2006 | Preyer | |
| 7,207,571 B2 | | 4/2007 | Yoshida et al. | |
| 2004/0012153 A1 | | 1/2004 | Yoshida et al. | |
| 2005/0184466 A1 | * | 8/2005 | Yoshida et al. | 277/468 |
| 2006/0006604 A1 | * | 1/2006 | Abe et al. | 277/434 |

FOREIGN PATENT DOCUMENTS

| | | |
|---|---|---|
| JP | 2003-113940 | 4/2003 |
| JP | 2003-520931 | 7/2003 |
| JP | 3801250 | 7/2006 |
| JP | 2007-064346 | 3/2007 |
| WO | WO 2008151589 A1 * | 12/2008 |

* cited by examiner (a)

INTERNAL COMBUSTION ENGINE OIL RING

TECHNICAL FIELD

The present invention relates to an oil ring used in an internal combustion engine. More specifically, the present invention relates to an oil ring characterized by a shape in vertical cross-section along a sliding direction of at least one of an upper rail and a lower rail constituting an oil ring main body.

BACKGROUND ART

Along with recent improvement in the performance of motorcar engines, there is a need for an oil ring used in an internal combustion engine which has achieved a satisfactory reduction in the amount of oil consumption. Accordingly, twists have been added to the shape and the like of an oil ring. For example, there is available an oil ring characterized by a shape in vertical cross-section along a sliding direction of at least one of an upper rail and a lower rail of an oil ring main body.

For example, Patent Literature 1 (Japanese Patent No. 3801250) discloses a two-piece combined internal combustion engine oil ring which reduces the amount of lubricating oil consumption by inhibiting the oil-scraping-up action during a piston upstroke or amplifying the oil-scraping action. More specifically, Patent Literature 1 discloses an oil ring including one rail 11 projecting at a center portion of an outer peripheral surface of an oil ring main body 10, the outer peripheral shape in cross-section of a peak portion of the rail 11 including a contact surface 14 in peripheral contact with and parallel to a cylinder inner peripheral surface 40 and a tapered surface 15 arranged on the upper side so as to be continuous with the contact surface 14 and increasing a ring diameter downward or including one rail in which a rail peak portion has a contact surface 16 parallel to the cylinder inner peripheral surface 40, the contact surface having a width of 0.15 to 0.3 mm.

Patent Literature 2 (National Publication of International Patent Application No. 2003-520931) discloses an oil-scraper piston ring (1) having at least one tapered flange (2, 3) covered with a wear-resistant coating (5). More specifically, Patent Literature 2 discloses an oil-scraper piston ring including at least one tapered flange (2, 3) having the wear-resistant coating (5), wherein in a region of the tapered ring plane of the flange (2, 3), a radial elevation (6) is provided so as to include the wear-resistant coating (5) and have a radial height (t) and an axial width (h5') that can be determined in advance.

CITATION LIST

Patent Literature

[Patent Literature 1]
Japanese Patent No. 3801250
[Patent Literature 2]
National Publication of International Patent Application No. 2003-520931

SUMMARY OF INVENTION

Technical Problem

However, in the oil ring disclosed in Patent Literature 1, the shapes of an upper rail and a lower rail constituting the oil ring main body make a frictional area likely to increase with increase in the duration of use. This reduces pressing force of the oil ring against a cylinder inner wall surface and leaves a part of oil unscraped, which is likely to cause increase in the amount of oil consumption. In a general oil ring, reduction in pressing force against a cylinder inner wall surface due to, e.g., wear causes an upward flow of oil, and oil enters a cylinder combustion chamber of an engine. The oil may burn together to emit black smoke. Note that if tension of the oil ring is increased in order to solve the problem, friction between the cylinder inner wall surface and the oil ring becomes too large to inhibit smooth reciprocation of a piston.

Like the oil ring disclosed in Patent Literature 1, in the oil ring disclosed in Patent Literature 2, the shapes of an upper rail and a lower rail constituting an oil ring main body make a frictional area likely to increase with increase in the duration of use. This reduces pressing force of the oil ring against a cylinder inner wall surface and leaves a part of oil unscraped, which is likely to cause increase in the amount of oil consumption. For this reason, the oil ring disclosed in Patent Literature 2 cannot be said to be sufficient to reduce the amount of oil consumption. Additionally, in the manufacturing method disclosed in Patent Literature 2, since the shapes of the upper rail and lower rail are formed by forming projections at sliding portions through a plurality of polishing processes, it is difficult to form the upper rail and lower rail so as to have the sizes and shapes specified in Patent Literature 2 with high accuracy.

From the foregoing, the present invention has as its object to provide a high-quality oil ring which stably keeps the amount of oil consumption low for a long period and in which the shapes of an upper rail and a lower rail can be formed at low cost with high accuracy.

Solution to Problem

After intensive investigations, the present inventors have solved the above-described problems by forming an upper rail and a lower rail constituting an oil ring main body so as to have shapes satisfying predetermined conditions. The present invention will be described below.

Internal Combustion Engine Oil Ring According to Present Invention: An internal combustion engine oil ring according to the present invention is an oil ring comprising a generally ring-shaped oil ring main body that slides on a circular cylinder inner wall and a coil expander, an upper end of a web having a plurality of oil return holes for letting oil scraped from the cylinder inner wall surface flow down to an underside of a piston being connected to a lower surface of a first rail located on the upper side of the oil ring main body, a lower end of the web being connected to an upper surface of a second rail located on the lower side of the generally ring-shaped oil ring main body that slides on the circular cylinder inner wall surface, the upper rail, web, and lower rail being integral with each other, wherein a recessed stepped portion is formed at a corner of a sliding surface of an outer peripheral sliding projection in sliding contact with the cylinder inner wall surface of at least one of the first rail and the second rail constituting the oil ring main body, in a shape in vertical cross-section along a sliding direction of the first rail and second rail, and a wall surface of the recessed stepped portion has an arcuate surface having a radius of curvature of 0.02 mm to 0.08 mm.

In the internal combustion engine oil ring according to the present invention, the wall surface of the recessed stepped portion preferably includes an extending curved surface extending from the arcuate surface toward a side wall of the outer peripheral sliding projection so as to be continuous with the arcuate surface.

In the internal combustion engine oil ring according to the present invention, the wall surface of the recessed stepped portion preferably includes an extending flat surface extending from the arcuate surface toward the sliding surface of the outer peripheral sliding projection so as to be continuous with the arcuate surface.

In the internal combustion engine oil ring according to the present invention, an arc center of the arcuate surface is preferably located outside the sliding surface in sliding contact with the cylinder inner wall surface in an oil ring radial direction.

In the internal combustion engine oil ring according to the present invention, the oil ring main body is preferably chamfered at a corner of the sliding surface in sliding contact with the cylinder inner wall surface in the outer peripheral sliding projection having the recessed stepped portion.

In the internal combustion engine oil ring according to the present invention, oil ring main body axial length of the sliding surface in sliding contact with the cylinder inner wall surface in the outer peripheral sliding projection is preferably 0.02 mm to 0.18 mm.

In the internal combustion engine oil ring according to the present invention, the outer peripheral sliding projection of the first rail and the outer peripheral sliding projection of the second rail are preferably symmetrically located with respect to the web.

In the internal combustion engine oil ring according to the present invention, the outer peripheral sliding projection of the first rail and the outer peripheral sliding projection of the second rail are preferably asymmetrically located with respect to the web.

In the internal combustion engine oil ring according to the present invention, it is preferable that the oil ring main body is made of stainless steel or steel and includes, as a hard layer, one or two or more selected from among the group consisting of a nitrided layer, a PVD layer, and a DLC layer at least at the sliding surface of the outer peripheral sliding projection.

Method for Manufacturing Internal Combustion Engine Oil Ring According to Present Invention: A method for manufacturing an internal combustion engine oil ring according to the present invention is a method for manufacturing the above-described internal combustion engine oil ring including the following steps A and B in this order.

Step A: A step of nitriding at least an outer peripheral sliding surface of the oil ring main body made of stainless steel or steel constituting the oil ring.

Step B: A step of grinding a portion in a circumferential direction of the outer peripheral sliding surface of the oil ring main body and forming a recessed stepped portion at a corner of the sliding surface.

The method for manufacturing the internal combustion engine oil ring according to the present invention preferably further includes forming a PVD layer and/or a DLC layer at least at the sliding surface in sliding contact with a cylinder inner wall surface of the oil ring main body after the step B.

Advantageous Effects of Invention

In an internal combustion engine oil ring according to the present invention, an oil ring main body is formed so as to have a shape satisfying conditions specified in the present invention. This configuration allows inhibition of variation in pressing force of the oil ring against a cylinder inner wall surface, which ensures long-term stable reduction in the amount of oil consumption and achieves improvement in fuel efficiency. A method for manufacturing an internal combustion engine oil ring according to the present invention can manufacture an oil ring main body so as to have a shape satisfying conditions specified in the present invention with high accuracy.

DESCRIPTION OF EMBODIMENTS

The present invention will be described below in more detail in the context of a preferred embodiment of an internal combustion engine oil ring according to the present invention with reference to the drawings.

Figure 1:
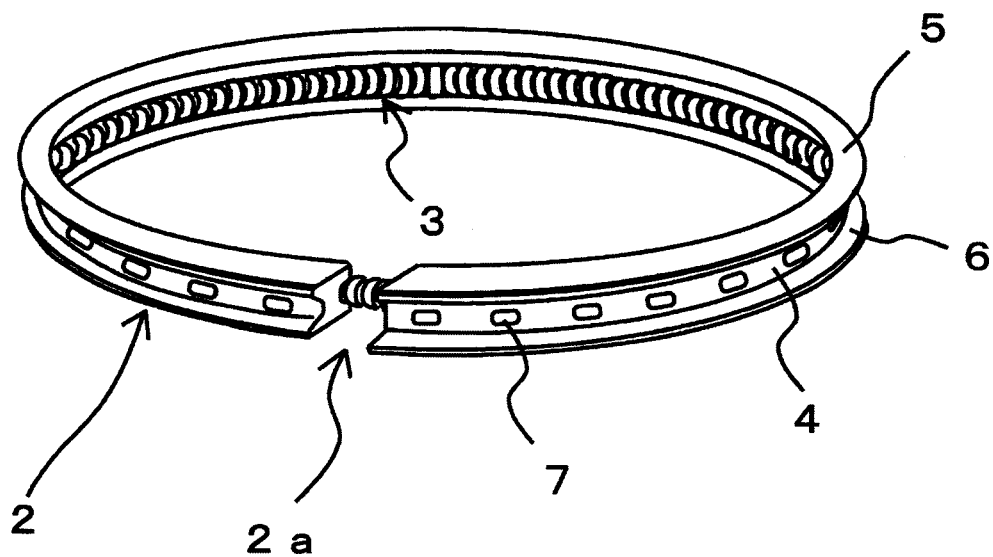
FIG. 1 is a perspective view of an internal combustion engine oil ring which is composed of an oil ring main body and a coil expander arranged along an inner periphery of the oil ring main body.

FIG. 1 is a perspective view of an internal combustion engine oil ring which is composed of an oil ring main body and a coil expander arranged along an inner periphery of the oil ring main body. As shown in FIG. 1, an internal combustion engine oil ring 1 according to the present invention is composed of an oil ring main body 2 and a coil expander 3. The oil ring main body 2 is a ring having a generally I-shaped cross-section and includes a joint 2a. A first rail 5 on the upper side, a second rail 6 on the lower side, and a web 4 which connects the rails and is located at a middle portion of the oil ring main body 2 are integrated into the oil ring main body 2.

The first rail 5 and second rail 6 constituting the oil ring main body 2 are each formed in a generally circular shape in a circumferential direction of the internal combustion engine oil ring 1. Respective outer peripheral sliding surfaces of the first rail 5 and second rail 6 come into contact with an inner wall surface of a cylinder through an oil film and slide in a piston axial direction. As shown in FIG. 1, the web 4 also has a generally circular shape in the circumferential direction of the internal combustion engine oil ring 1. The web 4 includes an oil return hole 7 formed so as to penetrate therethrough in a radial direction, and a plurality of oil return holes 7 are arranged in the circumferential direction of the internal combustion engine oil ring 1. As shown in FIG. 1, the coil expander 3 is obtained by bending a spiral spring into a circular arc.

Figure 2:
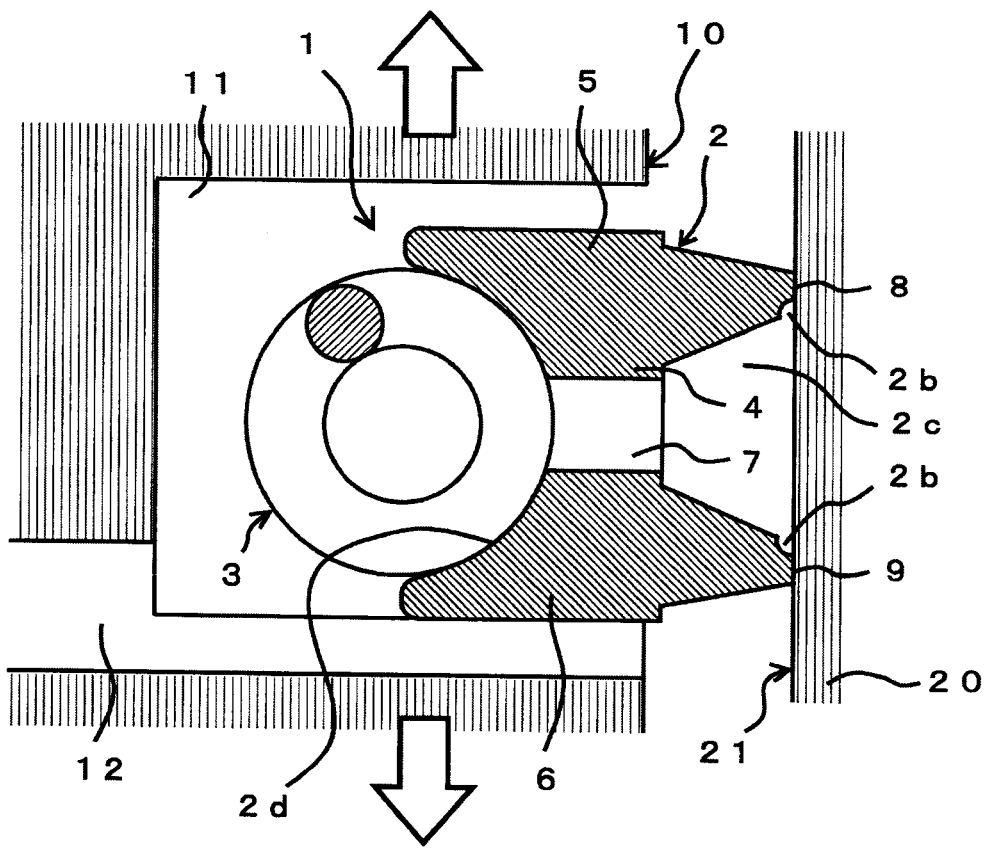
FIG. 2 is a cross-sectional view showing the internal combustion engine oil ring according to the present invention cut in a cylinder axial direction for explaining a state in which the internal combustion engine oil ring is fit in an oil ring groove in a piston.

FIG. 2 is a cross-sectional view showing the internal combustion engine oil ring according to the present invention taken in the cylinder axial direction for explaining a state in which the internal combustion engine oil ring is fit in an oil ring groove in a piston. As shown in FIG. 2, on the outer peripheral surface side of the oil ring main body 2, an outer peripheral groove 2c in a concave (portion) as seen in cross-section in an oil ring axial direction is formed by the first rail 5 and second rail 6 and the web 4. Additionally, the coil expander 3 is received in a state covered by a generally semicircular recess 2d on the oil ring main body inner peripheral side formed by the first rail 5 and second rail 6 of the oil ring main body 2, as seen in cross-section in the cylinder axial direction. As described above, the coil expander 3 is stably arranged on the inner peripheral side of the oil ring main body 2 and presses the oil ring main body 2 against an inner wall surface 21 of a cylinder 20 in this state. Note that although not shown, in the coil expander 3, a core wire for joining is used at a joint of the coil expander to form the joint and transform the spiral spring into an annual coil.

For reference, the function of the internal combustion engine oil ring 1 of scraping oil on the cylinder inner wall surface 21 will be described step by step with reference to FIG. 2. First, when a piston 10 reciprocates (in directions of arrows in FIG. 2), outer peripheral sliding surfaces 8 and 9 of the first rail 5 and second rail 6 of the oil ring main body 2 scrape excess oil adhering to the inner wall surface 21 of the cylinder 20. The scraped oil is received to remain temporarily in the outer peripheral groove 2c of the oil ring main body 2, then flows down to an underside of the piston 10 through the oil return holes 7 and an oil drain hole 12 which is formed in the oil ring groove 11, and is returned to an oil pan (not shown).

To scrape excess oil on the cylinder inner wall surface 21 by the internal combustion engine oil ring 1, as described above, in the shape in vertical cross-section along a sliding direction of the first rail 5 and second rail 6 constituting the oil ring main body 2 of the internal combustion engine oil ring 1 according to the present invention, at least one rail has a recessed stepped portion 2b formed at a corner of the outer peripheral sliding surface 8 or 9 of an outer peripheral sliding projection in sliding contact with the cylinder inner wall surface of the rail. Forming the first rail 5 and second rail 6 so as to have outer peripheral shapes as shown in, e.g., FIG. 2 makes the areas of the outer peripheral sliding surfaces 8 and 9 of the first rail 5 and second rail 6 unlikely to change even if the oil ring is used for a long period and allows long-term retainment of the effect of inhibiting increase in the amount of oil consumption. Additionally, forming the first rail 5 and second rail 6 constituting the oil ring main body 2 so as to have shapes as illustrated in FIG. 2 achieves improvement in and stabilization of the function of scraping excess oil on the cylinder inner wall surface 21 and the function of controlling the thickness of an oil film on the cylinder inner wall surface 21. As a result, the internal combustion engine oil ring 1 allows oil scraped by itself to drain quickly to the oil drain hole 12 provided on the oil ring back side, and the amount of oil consumption can be reduced.

Figure 3:
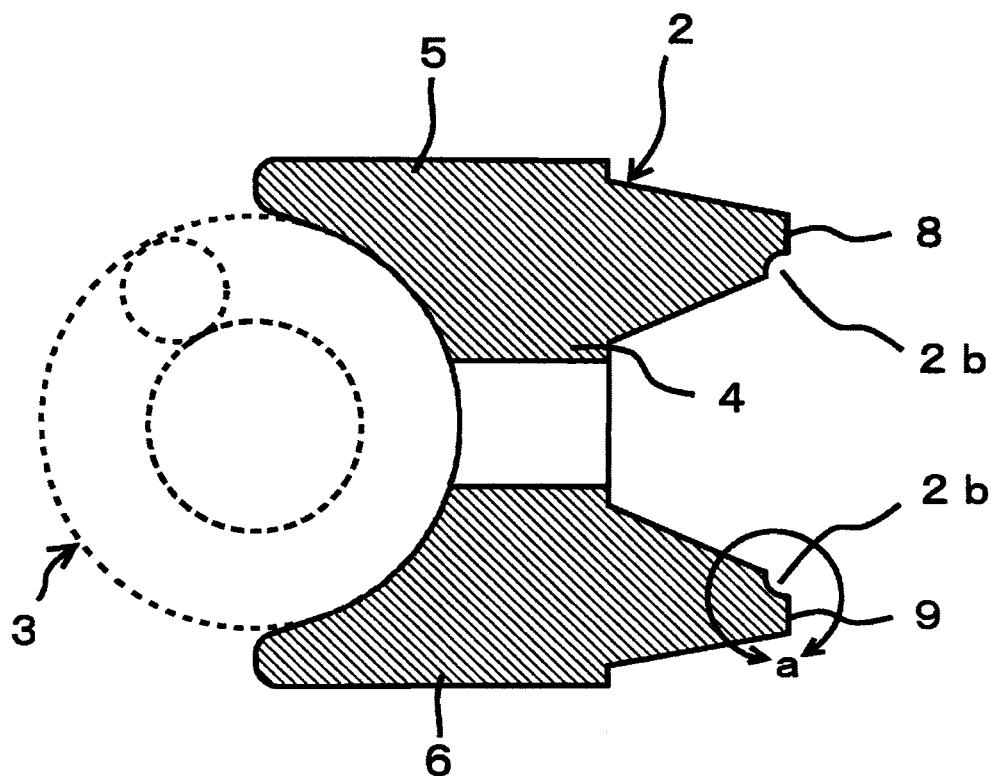
FIG. 3 is a cross-sectional view illustrating the shape of a rail outer peripheral surface of the oil ring main body according to the present invention, with the oil ring main body taken in an oil ring axial direction.
Figure 3:
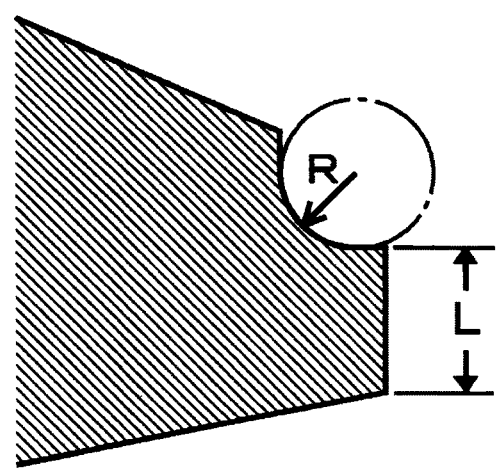

FIG. 3 is a cross-sectional view illustrating the shape of a rail outer peripheral surface of the oil ring main body according to the present invention, with the oil ring main body taken in an oil ring axial direction. As shown in FIG. 3, in the internal combustion engine oil ring 1 according to the present invention, the outer peripheral shapes of the first rail 5 and second rail 6 each include a circular arc shape with a radius R of curvature of 0.02 mm to 0.08 mm at a wall surface of the recessed stepped portion 2b after the recessed stepped portion is formed at the corner of the sliding surface of the outer peripheral sliding projection in sliding contact with the cylinder inner wall surface. FIG. 3(a) shows a main portion enlarged view of a shape (a portion surrounded by a line a in FIG. 3) including the circular arc shape with the radius R of curvature at the wall surface of the recessed stepped portion formed in the second rail 6 constituting the oil ring main body 2 according to the present invention. Note that the outer peripheral shapes of the first rail 5 and second rail 6 in the oil ring main body 2 according to the present invention can be formed by grinding the first rail 5 and second rail 6 while pressing, e.g., an abrasive material or a grindstone against the rotating first rail 5 and second rail 6. Accordingly, in the oil ring main body 2 according to the present invention, the outer peripheral shapes of the rails can be formed with high accuracy of dimension by a simple method not requiring special equipment and special skills.

Assuming here that the wall surface of each recessed stepped portion includes a circular arc shape with a radius R of curvature of less than 0.02 mm, stress concentrates at the foot of the outer peripheral sliding projection, and cracking, chipping, or the like is likely to occur. Note that the outer peripheral sliding projections in the oil ring main body according to the present invention are projecting portions with surfaces to slide on the cylinder inner wall surface at the top, excluding the recessed stepped portions 2b formed in outer peripheries of the first rail 5 and second rail 6. If a grindstone or the like is used to form the outer peripheral shapes of the rails, and the grindstone or the like is used for a long period, wear occurs at a grinding portion of the grindstone or the like to cause the difficulty in maintaining the accuracy of the circular arc shape. This is because when a recessed stepped portion including a circular arc shape is formed at each wall surface, the circular arc shape depends on the shape of the grindstone. Accordingly, the radius R of curvature of less than 0.02 mm of the circular arc shape increases the cost of management and the like for stably maintaining the quality of the rails for a long period and is thus undesirable. On the other hand, if the wall surface of each recessed stepped portion includes a circular arc shape with a radius R of curvature of more than 0.08 mm, the wall surface of the recessed stepped portion is generally tapered. With increase in the duration of use of the oil ring, a sliding area is more likely to increase, pressing force of the oil ring against the cylinder inner wall surface decreases, and oil is more likely to be left unscraped. This can easily lead to increase in the amount of oil consumption and is thus undesirable. Note that the radius R of curvature at the wall surface of the recessed stepped portion is more preferably 0.04 mm to 0.06 mm.

Figure 4:
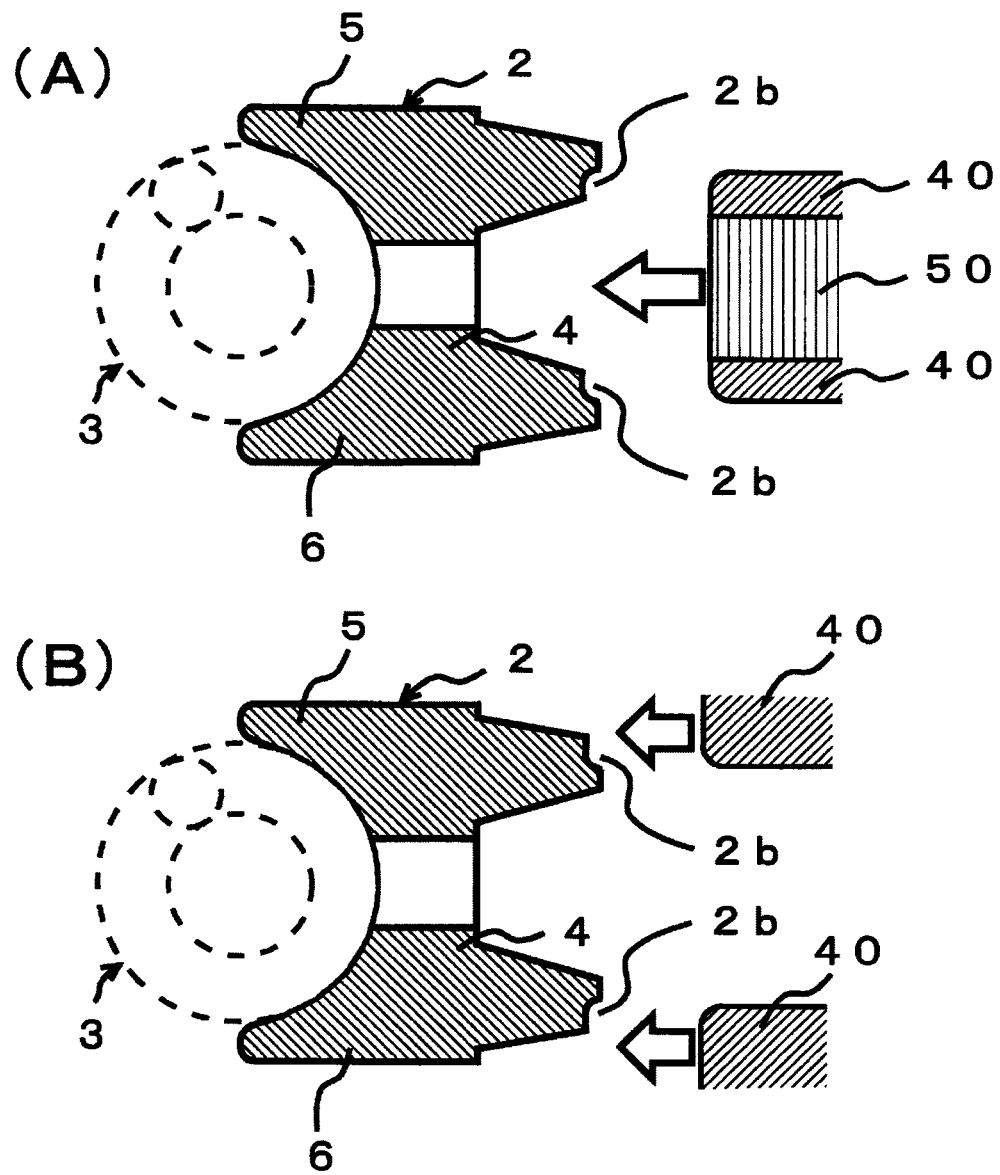
FIG. 4 are views illustrating a method for forming the outer peripheral shapes of a first rail and a second rail of the oil ring main body according to the present invention.

FIG. 4 are views illustrating a method for forming the outer peripheral shapes of the first rail and second rail of the oil ring main body according to the present invention. FIG. 4(A) shows a method for forming the recessed stepped portion 2b including a circular arc shape on the side facing the web 4 of the outer peripheral sliding surface of each of the first rail 5 and second rail 6 constituting the oil ring main body 2. FIG. 4(B) shows a method for forming the recessed stepped portion 2b including a circular arc shape at each of an upper side surface of the upper rail and a lower side surface of the lower rail of the oil ring main body of the outer peripheral sliding surfaces of the first rail 5 and second rail 6 constituting the oil ring main body 2. As shown in FIG. 4, the outer peripheral shapes of the first rail 5 and second rail 6 in the oil ring main body 2 according to the present invention can be formed by grinding the rails 5 and 6 while pressing a portion with the radius R of curvature of the circular arc shape specified in the present invention of, e.g., a rotating grindstone or the like against the outer peripheral sliding surfaces of the rails 5 and 6. FIG. 4(A) shows a machining example in which a grindstone 40 is provided on two sides of a metal plate 50, and the recessed stepped portions 2b are formed in the rails 5 and 6 in one step by pressing the grindstones 40 against the rails 5 and 6. Note that the grindstones 40 to be pressed against the rails 5 and 6 at the time of forming the oil ring main body 2 according to the present invention are not limited to the ones provided on both side of the metal plate 50 shown in FIG. 4(A) and may be each composed entirely of only the grindstone 40. In an internal combustion engine oil ring according to the present invention, the outer peripheral shape of an oil ring main body can be formed by a simple method with a small number of processing steps as described above. Accordingly, an oil ring excellent in cost performance can be provided.

In the internal combustion engine oil ring 1 according to the present invention, the wall surface of the recessed stepped portion formed at a corner of the sliding surface 8 or 9 of the outer peripheral sliding projection in sliding contact with the cylinder inner wall surface of at least one of the first rail 5 and second rail 6 constituting the oil ring main body 2 preferably includes a curved surface extending from an arcuate surface toward a side wall of the outer peripheral sliding projection so as to be continuous therewith.

Figure 5:
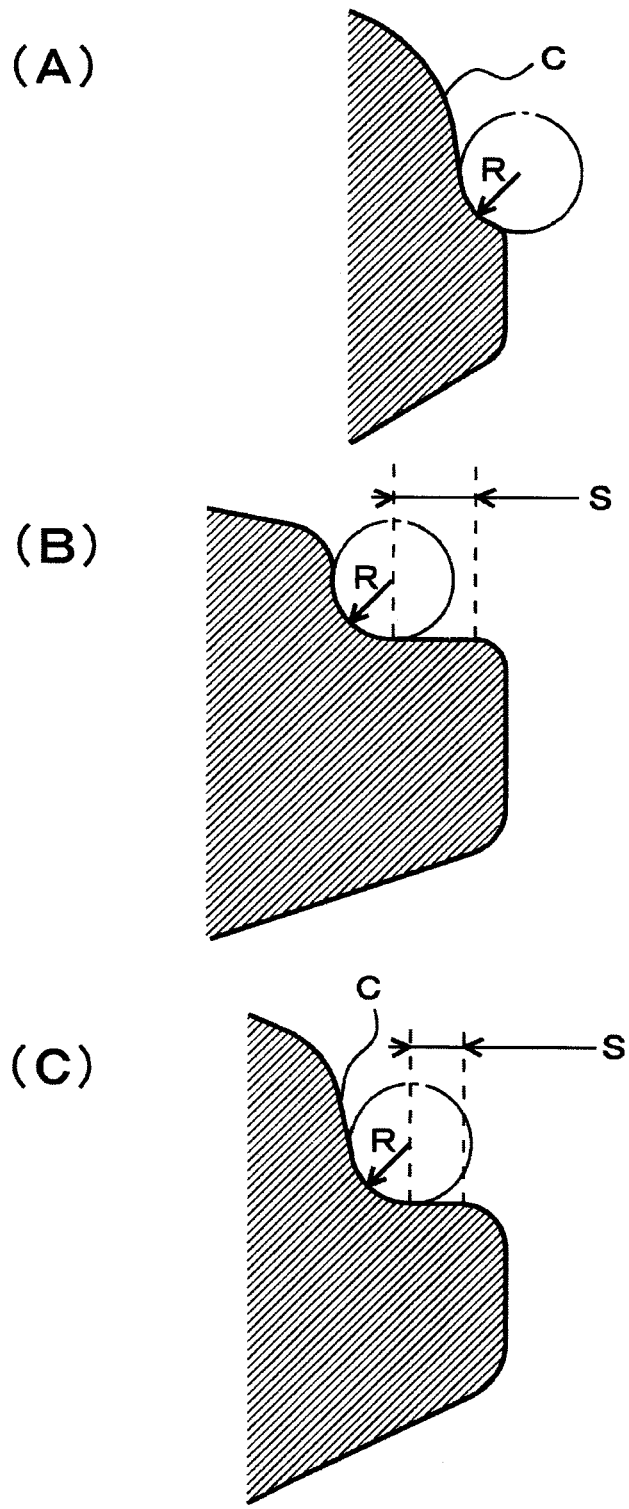
FIG. 5 are main portion cross-sectional views illustrating the oil ring main body taken in the oil ring axial direction for explaining the shape of a wall surface of a recessed stepped portion formed in the oil ring main body according to the present invention.

FIG. 5 are main portion cross-sectional views illustrating the oil ring main body taken in the oil ring axial direction for explaining shapes of the wall surface of a recessed stepped portion formed in the oil ring main body according to the present invention. Note that FIG. 5 illustrate the portion surrounded by the line a in FIG. 3. If the wall surfaces of the recessed stepped portions formed at respective corners of the sliding surfaces 8 and 9 of the respective outer peripheral sliding projections of the first rail 5 and second rail 6 constituting the oil ring main body 2 in the internal combustion engine oil ring 1 according to the present invention each include an extending curved surface C extending from an arcuate surface toward a side wall of the outer peripheral sliding projection so as to be continuous with the arcuate surface, as shown in FIG. 5(A), the internal combustion engine oil ring 1 according to the present invention allows oil scraped by itself to drain quickly to the oil drain hole provided on the oil ring back side, and the amount of oil consumption can be reduced.

In the internal combustion engine oil ring 1 according to the present invention, the wall surface of the recessed stepped portion formed at a corner of the sliding surface 8 or 9 of the outer peripheral sliding projection in sliding contact with the cylinder inner wall surface of at least one of the first rail 5 and second rail 6 constituting the oil ring main body 2 preferably includes an extending flat surface extending from an arcuate surface toward the sliding surface 8 or 9 of the outer peripheral sliding projection so as to be continuous with the arcuate surface.

If the wall surfaces of the recessed stepped portions formed at respective corners of the sliding surfaces 8 and 9 of the respective outer peripheral sliding projections of the first rail 5 and second rail 6 constituting the oil ring main body 2 in the internal combustion engine oil ring 1 according to the present invention each include an extending flat surface S extending from an arcuate surface toward the sliding surface 8 or 9 of the outer peripheral sliding projection so as to be continuous with the arcuate surface, as shown in FIG. 5(B), a sliding area of the outer peripheral sliding projection is unlikely to be changed. As a result, pressing force of the oil ring against the cylinder inner wall surface can be inhibited from being reduced even if the oil ring is used for a long period, and the oil-scraping performance of the oil ring itself can be retained for a long period.

In the internal combustion engine oil ring 1 according to the present invention, the wall surfaces of the recessed stepped portions formed at respective corners of the sliding surfaces 8 and 9 of the respective outer peripheral sliding projections of the first rail 5 and second rail 6 constituting the oil ring main body 2 can each include an extending curved surface C extending from an arcuate surface toward a side wall of the outer peripheral sliding projection so as to be continuous with the arcuate surface and an extending flat surface S extending from the arcuate surface toward the sliding surface 8 or 9 of the outer peripheral sliding projection so as to be continuous with the arcuate surface, as shown in FIG. 5(C). The internal combustion engine oil ring 1 according to the present invention can produce the greater effect of reducing the amount of oil consumption when the wall surface of each recessed stepped portion in the oil ring main body 2 is formed so as to have the shape shown in FIG. 5(C).

In the internal combustion engine oil ring 1 according to the present invention, an arc center of an arcuate surface at the wall surface of the recessed stepped portion formed at a corner of the sliding surface 8 or 9 of the outer peripheral sliding projection in sliding contact with the cylinder inner wall surface of at least one of the first rail 5 and second rail 6 constituting the oil ring main body 2 is preferably located outside the outer peripheral sliding surface 8 or 9 in sliding contact with the cylinder inner wall surface in an oil ring radial direction.

Figure 6:
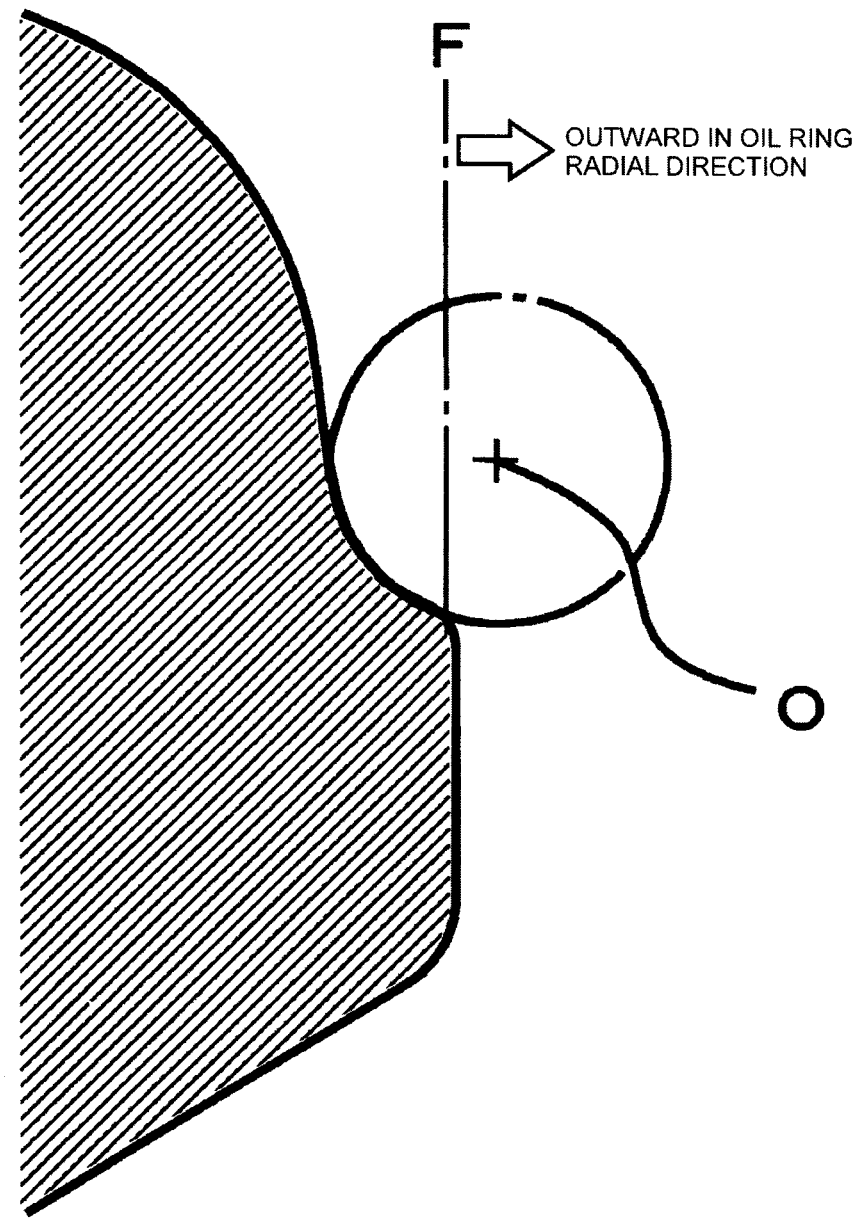
FIG. 6 is a main portion cross-sectional view illustrating the oil ring main body taken in the oil ring axial direction for explaining the position of an arc center of an arcuate surface at the wall surface of the recessed stepped portion formed in the oil ring main body according to the present invention.

FIG. 6 is a main portion cross-sectional view illustrating the oil ring main body according to the present invention taken in the oil ring axial direction for explaining the position of an arc center of an arcuate surface at the wall surface of each recessed stepped portion formed in the oil ring main body. Note that a cross-section of a main portion of the portion surrounded by the line a in FIG. 3 is illustrated in FIG. 6. As shown in FIG. 6, in the internal combustion engine oil ring 1 according to the present invention, an arc center (O in FIG. 6) of an arcuate surface at the wall surface of each of the recessed stepped portions formed at the corners of the sliding surfaces 8 and 9 of the outer peripheral sliding projections of the first rail 5 and second rail 6 constituting the oil ring main body 2 is located outside the sliding surface 8 or 9 (F in FIG. 6) in sliding contact with the cylinder inner wall surface in the radial direction of the oil ring 1 (a direction of the arrow in FIG. 6). This allows reduction in the amount of machining and increase in the life of an abrasive member, a grindstone, or the like used for machining. Additionally, forming outer peripheral sliding portions of the first rail 5 and second rail 6 in the oil ring main body 2 so as to have the shape shown in FIG. 6 allows improvement in the durability of the oil ring main body 2 and reduction in the amount of oil consumption.

In the internal combustion engine oil ring 1 according to the present invention, the corners of the sliding surfaces 8 and 9 in sliding contact with the cylinder inner wall surface in the outer peripheral sliding projections having the recessed stepped portions of the oil ring main body 2 are preferably chamfered.

As shown in FIG. 5, in the internal combustion engine oil ring 1 according to the present invention, chamfering of the corners of the sliding surfaces 8 and 9 in sliding contact with the cylinder inner wall surface in the outer peripheral sliding projections with the recessed stepped portions formed at the corners of the sliding surfaces of the outer peripheral sliding projections of the first rail 5 and second rail 6 constituting the oil ring main body 2 allows inhibition of chipping and the like at an end of each sliding surface at the time of forming a hard film such as a PVD film or a DLC film. Chamfering of the corners of the sliding surfaces 8 and 9 in sliding contact with the cylinder inner wall surface of the outer peripheral sliding projections also allows reduction in sliding friction with the cylinder inner wall surface and improvement in oil control performance.

In the internal combustion engine oil ring according to the present invention, a length L (see FIG. 3(*a*)) in an oil ring main body axial direction of the sliding surfaces 8 and 9 in sliding contact with the cylinder inner wall surface in the outer peripheral sliding projections of the first rail 5 and second rail 6 is preferably 0.02 mm to 0.18 mm. If the length L in the oil ring main body axial direction is less than 0.02 mm, pressing force of the oil ring main body against the cylinder inner wall surface increases to prevent improvement in the oil control function of the oil ring and increase aggression against the cylinder inner wall surface, which is undesirable. On the other hand, if the length L in the oil ring main body axial direction is more than 0.18 mm, the pressing force of the oil ring main body against the cylinder inner wall surface decreases, and the oil ring main body cannot sufficiently fulfill the function of scraping excess oil on the cylinder inner wall surface, which is undesirable.

Figure 7:
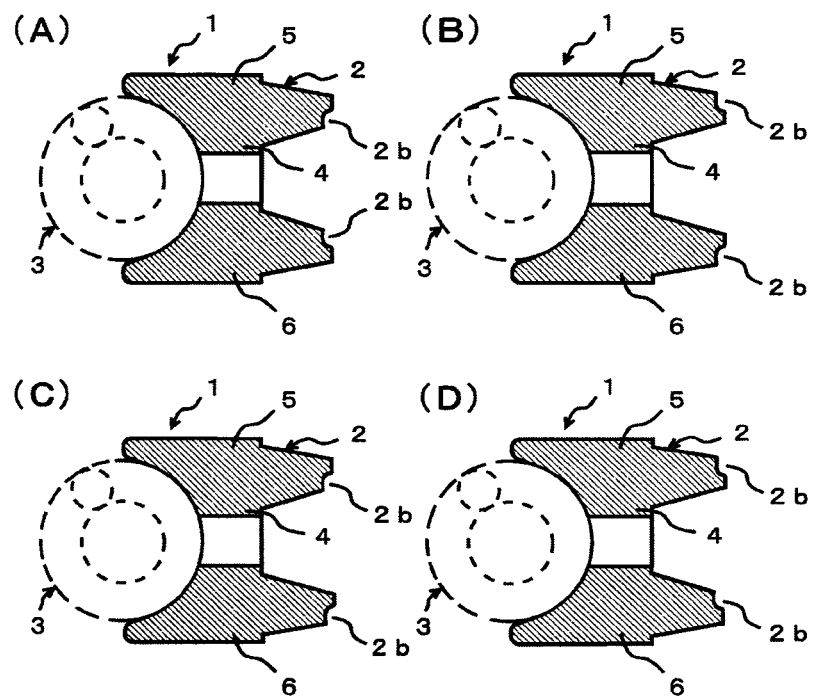
FIG. 7 are cross-sectional views showing the oil ring main body according to the present invention taken in the oil ring axial direction for explaining shape patterns of the oil ring main body.

In the internal combustion engine oil ring 1 according to the present invention, the outer peripheral sliding projection of the first rail 5 and the outer peripheral sliding projection of the second rail 6 are preferably symmetrically located with respect to the web 4. Note that the outer peripheral sliding projections in the oil ring main body according to the present invention are projecting portions with surfaces to slide on the cylinder inner wall surface at the top, excluding the recessed stepped portions 2*b* formed in outer peripheries of the first rail 5 and second rail 6, as described above. FIG. 7 are cross-sectional views showing the oil ring main body according to the present invention taken in the oil ring axial direction for explaining shape patterns of the oil ring main body. FIGS. 7(A) and 7(B) illustrate shapes of the oil ring main body 2 when the outer peripheral sliding projection of the first rail 5 and the outer peripheral sliding projection of the second rail 6 are symmetrically located with respect to the web 4. If the oil ring main body 2 has either one of the shapes shown in FIGS. 7(A) and 7(B), the oil ring 1 is no danger of being assembled to the piston upside down at the time of assembly. If a grindstone is used, as shown in FIG. 4(A) or 4(B), to form outer peripheral shapes (the recessed stepped portions 2*b*) of the first rail and second rail as shown in FIGS. 7(A) and 7(B), the outer peripheral shapes can be formed in one step without complicating the shape of the grindstone. This allows formation of the oil ring main body 2 at low cost.

In the internal combustion engine oil ring 1 according to the present invention, it is also preferable that the outer peripheral sliding projection of the first rail 5 and the outer peripheral sliding projection of the second rail 6 are asymmetrically located with respect to the web 4. The internal combustion engine oil ring 1 according to the present invention is not limited to ones as shown in FIGS. 7(A) and 7(B) in which an outer peripheral sliding projection of the first rail 5 and an outer peripheral sliding projection of the second rail 6 are symmetrically located with respect to the web 4. For example, as shown in FIGS. 7(C) and 7(D), an outer peripheral sliding projection of the first rail 5 and an outer peripheral sliding projection of the second rail 6 may be asymmetrically located with respect to the web 4. Even in this case, if a grindstone is used to form outer peripheral shapes (the recessed stepped portions 2*b*) of the first rail and second rail, the outer peripheral shapes can be formed in one step without complicating the shape of the grindstone. This allows formation of the oil ring main body 2 at low cost.

In the internal combustion engine oil ring 1 according to the present invention, it is preferable that the oil ring main body 2 is made of stainless steel or steel and that at least a sliding surface of an outer peripheral sliding projection includes, as a hard layer, one or two or more selected from among the group consisting of a nitrided layer, a PVD layer, and a DLC layer.

In the internal combustion engine oil ring 1 according to the present invention, the oil ring main body 2 is preferably made of stainless steel or steel in terms of durability. Note that stainless steel is based on an iron-chromium alloy. Nickel, molybdenum, and the like are added to stainless steels in order to improve properties such as corrosion resistance and processability, and stainless steels are broadly divided into iron-chromium-based ones and iron-chromium-nickel-based ones. Steel is an alloy based on iron and carbon. For example, if an oil ring main body made of stainless steel is used as the oil ring main body according to the present invention, 8Cr steel, 13Cr steel, 18Cr steel, or the like can be suitably used. If an oil ring main body made of steel is used as the oil ring main body according to the present invention, an SK material (tool steel), SWRH, or the like can be suitably used. For reference, materials suitably used for the oil ring main body according to the present invention and their compositions will be described below. Note that the material for the oil ring main body according to the present invention is not limited to the materials.

8Cr steel can be used as the material for the oil ring main body according to the present invention. 8Cr steel here has a composition of 0.6 to 0.8% by mass of carbon, 0.15 to 0.35% by mass of silicon, 0.20 to 0.40% by mass of manganese, 7.00 to 9.00% by mass of chromium, 0.04% or less by mass of phosphorus, 0.03% or less by mass of sulfur, and the balance iron and unavoidable impurities.

13Cr steel can be used as the material for the oil ring main body according to the present invention. 13Cr steel here has a composition of 0.6 to 0.7% by mass of carbon, 0.25 to 0.5% by mass of silicon, 0.20 to 0.50% by mass of manganese, 13.0 to 14.0% by mass of chromium, 0.2 to 0.4% by mass of molybdenum, 0.03% or less by mass of phosphorus, 0.03% or less by mass of sulfur, and the balance iron and unavoidable impurities.

17Cr steel can be used as the material for the oil ring main body according to the present invention. 17Cr steel here has a composition of 0.80 to 0.95% by mass of carbon, 0.35 to 0.5% by mass of silicon, 0.25 to 0.40% by mass of manganese, 17.0 to 18.0% by mass of chromium, 1.00 to 1.25% by mass of molybdenum, 0.04% or less by mass of phosphorus, 0.04% or less by mass of sulfur, 0.08 to 0.15% by mass of vanadium, and the balance iron and unavoidable impurities.

An SK material (a material corresponding to SK5) can be used as the material for the oil ring main body according to the present invention. The SK material (the material corresponding to SK5) here has a composition of 0.79 to 0.86% by mass of carbon, 0.15 to 0.35% by mass of silicon, 0.30 to 0.60% by mass of manganese, 0.03% or less by mass of phosphorus, 0.03% or less by mass of sulfur, and the balance iron and unavoidable impurities.

SWRH (a material corresponding to SWRS77B) can be used as the material for the oil ring main body according to the present invention. SWRH (the material corresponding to SWRS77B) here has a composition of 0.75 to 0.80% by mass of carbon, 0.12 to 0.32% by mass of silicon, 0.60 to 0.90% by mass of manganese, 0.025% or less by mass of phosphorus, 0.025% or less by mass of sulfur, 0.2% or less by mass of copper, and the balance iron and unavoidable impurities.

Figure 8:
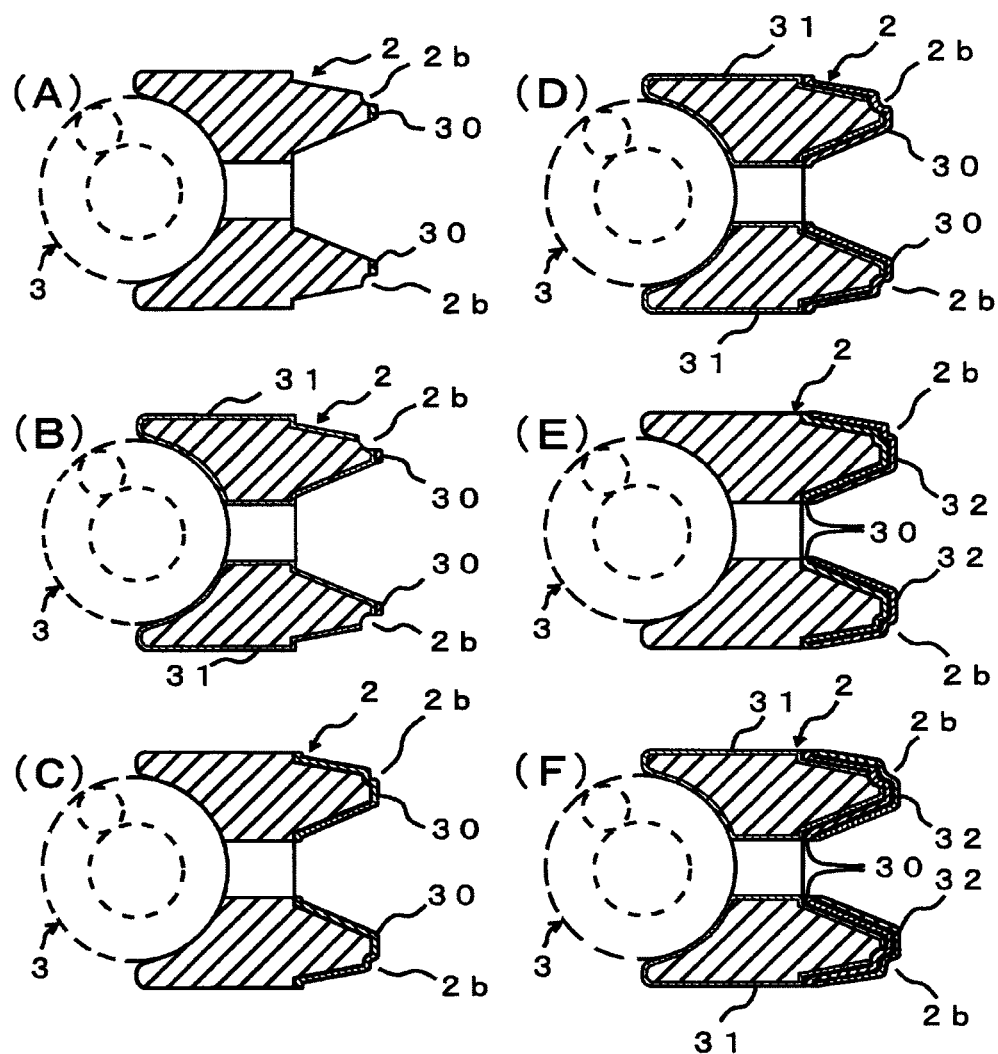
FIG. 8 are cross-sectional views illustrating a state in which the oil ring main body according to the present invention includes a hard layer at an outer surface, with the oil ring main body taken in the oil ring axial direction.

FIG. 8 are cross-sectional views illustrating a state in which the oil ring main body according to the present invention includes a hard layer at an outer surface, with the oil ring main body taken in the oil ring axial direction. FIG. 8(A) shows a state in which the oil ring main body 2 includes respective hard layers 30 only at the sliding surfaces. FIG. 8(B) shows a state in which the oil ring main body 2 includes a hard layer 31 across the entire surface and further includes the respective hard layers 30 on the hard layer 31 at the sliding surfaces. For example, in FIG. 8(B), a nitrided layer can be adopted as the hard layer 31, and a PVD layer or a DLC layer can be adopted as the hard layer 30.

FIG. 8(C) shows a state in which the hard layers 30 are formed not only at the outer peripheral sliding surfaces but also at outer peripheral surfaces except for the outer peripheral sliding surfaces. In FIG. 8(C) as well, a PVD layer or a DLC layer can be considered as an example of the hard layer 30. As shown in FIG. 8(C), for example, the hard layer 30 (a PVD layer or a DLC layer) may be directly formed without nitriding on the base material. FIG. 8(D) shows a state in which the oil ring main body 2 includes the hard layer 31 across the entire surface and further includes the hard layer 30 not only at the outer peripheral sliding surfaces but also at the outer peripheral surfaces except for the outer peripheral sliding surfaces. For example, in FIG. 8(D) as well, a nitrided layer can be adopted as the hard layer 31, and a PVD layer or a DLC layer can be adopted as the hard layer 30. As shown in FIGS. 8(C) and 8(D), if the hard layer 30 is formed not only at the outer peripheral sliding surfaces but also at the outer peripheral surfaces except for the outer peripheral sliding surfaces, manufacturing costs can be reduced without complicating steps.

FIG. 8(E) shows a state in which the hard layers 30 are formed not only at the outer peripheral sliding surfaces but also at the outer peripheral surfaces except for the outer peripheral sliding surfaces, and the oil ring main body 2 includes hard layers 32 on the hard layers 30. For example, in FIG. 8(E), a PVD layer can be adopted as the hard layer 30, and a DLC layer can be adopted as the hard layer 32. FIG. 8(F) shows a state in which the oil ring main body 2 includes the hard layer 31 across the entire surface, also includes the hard layers 30 on the hard layer 31 not only at the outer peripheral sliding surfaces but also at the outer peripheral surfaces except for the outer peripheral sliding surfaces, and further includes the hard layers 32 on the hard layers 30. For example, in FIG. 8(E), a nitrided layer can be adopted as the hard layer 31, a PVD layer can be adopted as the hard layer 30, and a DLC layer can be adopted as the hard layer 32. The initial conformability of the oil ring to the cylinder can be improved by forming a DLC layer on a PVD layer, as shown in FIGS. 8(E) and 8(F).

As shown in FIG. 8, the oil ring main body 2 according to the present invention can achieve further improvement in wear resistance and reduction in friction by including one or two or more selected from among the group consisting of a nitrided layer, a PVD layer (Physical Vapor Deposition film) made of CrN, $Cr_2N$, or a mixture of, e.g., Cr, $Cr_2N$, and CrN, and a DLC layer (Diamond Like Carbon film) at least at the outer peripheral sliding surfaces of the rail portions. Note that if the oil ring main body includes PVD layers or DLC layers at the sliding surfaces of the rail portions, it is more preferable to include a nitrided layer inside each layer for rapid improvement in wear resistive performance.

Any nitriding method, such as gas nitriding, ion nitriding, salt bath nitriding, or sulphonitriding, can be adopted to form a nitrided layer. Hardening of the outer surface of the oil ring main body 2 by subjecting the oil ring main body 2 to nitriding allows improvement in durability. The outer surface is hardened because the oil ring main body 2 is required to have higher wear resistance due to recent increase in the speed of and the load on an internal combustion engine for an automobile. If a steel material is used as the material for the oil ring main body 2, the oil ring main body 2 subjected to nitriding includes an extremely hard nitrided layer made of a nitride that is the product of reaction with chromium or iron. That is, inclusion of a nitrided layer at the surface of the oil ring main body 2 makes the oil ring main body 2 excellent in wear resistance and scuffing resistance by the cylinder and allows provision of an internal combustion engine oil ring which can withstand application under harsher conditions. In this case, the nitrided layer may be included across the entire surface of the oil ring main body or only at the sliding surfaces in sliding contact with the cylinder inner wall surface of the oil ring main body. It is also preferable to further include a hard layer at the surface of a nitrided layer as has been described above by physical vapor deposition (PVD) or the like for improvement in properties such as wear resistance.

In the internal combustion engine oil ring 1 according to the present invention, it is also preferable that each surface to slide on the cylinder inner wall surface 21 in the oil ring main body 2 includes a DLC layer. The DLC layer may be provided as an outermost layer of the sliding surface including a nitrided layer of the oil ring main body 2 described above or provided directly on the sliding surface without a nitrided layer therebetween. A DLC layer is known as a low-friction material with a lower coefficient of friction than that of a wear-resistant hard coating material such as TiN or CrN. Inclusion of a DLC layer at the surface of each sliding surface achieves reduction in friction and allows rapid improvement in conformability to the cylinder.

Note that the hard layer 31 is formed at the outer surface except for the recessed stepped portions 2b formed at the outer peripheries of the rail portions in the oil ring main body 2 shown in each of FIGS. 8(B), 8(D), and 8(F). This is because the recessed stepped portions 2b are formed by a grindstone at the corners of the sliding surfaces of the outer peripheral sliding projections of the oil ring main body 2 after, for example, a nitrided layer is formed as the hard layer 31 at the outer surface of the oil ring main body 2. As shown in FIGS. 8(B), 8(D), and 8(F), when the recessed stepped portions 2b are to be formed in the oil ring main body 2, the recessed stepped portions 2b can be formed with higher accuracy at the time of grinding with a grindstone or the like by, e.g., forming a nitrided layer as a hard layer in advance. Note that if a nitrided layer is formed in advance before formation of the recessed stepped portions 2b in the oil ring main body 2, an area where the nitrided layer formed at the surface of the oil ring main body 2 is lost increases with increase in the radius R of curvature of each recessed stepped portion 2b. However, since the recessed stepped portions 2b are formed at the corners of the sliding surfaces of the outer peripheral sliding projections in the oil ring main body 2 according to the present invention, a nitrided layer formed at the outer peripheral sliding surfaces is not completely lost, and the wear resistance of the oil ring main body 2 is not affected.

Method for Manufacturing Internal Combustion Engine Oil Ring According to Present Invention: A method for manufacturing an internal combustion engine oil ring according to the present invention is a method for manufacturing the above-described internal combustion engine oil ring according to the present invention and includes the following steps A and B in this order.

Step A: A step of nitriding at least an outer peripheral sliding surface of the oil ring main body made of stainless steel or steel constituting the oil ring.

Step B: A step of grinding a portion in a circumferential direction of the outer peripheral sliding surface of the oil ring main body to form a recessed stepped portion at a corner of the sliding surface.

A method for manufacturing the internal combustion engine oil ring 1 according to the present invention can achieve improvement in machining accuracy at the time of grinding a portion in a circumferential direction of each outer peripheral surface of the internal combustion engine oil ring 1 by including the step A and step B in this order. According to the method for manufacturing the internal combustion engine oil ring 1 according to the present invention, since the oil ring main body 2 can be manufactured with high accuracy so as to have a shape satisfying conditions specified in the present invention, an oil ring excellent in the total balance among friction performance, durability performance, and oil consumption performance can be provided.

In the method for manufacturing the internal combustion engine oil ring 1 according to the present invention, it is preferable to form a PVD layer and/or a DLC layer at least at each sliding surface in sliding contact with the cylinder inner wall surface of the oil ring main body 2 after the step B.

According to the method for manufacturing the internal combustion engine oil ring 1 according to the present invention, the durability of the oil ring main body 2 can be improved by forming a hard layer such as a PVD layer on each outer peripheral sliding surface of the oil ring main body 2 after grinding a portion in the circumferential direction of the sliding surface. Thus, according to the method for manufacturing the internal combustion engine oil ring 1 according to the present invention, the oil ring 1 which does not lose followability to the piston and can withstand, for a long period, repeated contact with the oil ring groove 11 can be provided by forming a PVD layer and/or a DLC layer at least at each sliding surface in sliding contact with the cylinder inner wall surface of the oil ring main body 2.

The present invention will be described below specifically with reference to examples and a comparative example. Note that the present invention is not limited to the examples below.

Example 1

In Example 1, an actual machine test was performed using a six cylinder diesel engine with a displacement of 10,000 cc and a cylinder bore of 125 mm to check if how a difference in the shapes of an upper rail and a lower rail of an oil ring main body to be used affects oil ring properties (friction performance, durability performance, and oil consumption performance). Note that the engine was operated at full load (WOT) for 100 hours. Three rings of a top ring, a second ring, and an oil ring were used in combination as piston rings. As the top ring, one obtained by subjecting a ring made of 17Cr steel and having an axial height of 3.5 mm and a radial thickness of 4.6 mm to gas nitriding and subjecting outer peripheral sliding surfaces to (Cr—N) PVD processing was used. As the second ring, one obtained by subjecting a ring made of 10Cr steel and having an axial height of 2.5 mm and a radial thickness of 4.5 mm to gas nitriding was used. As the oil ring, one obtained by subjecting a ring made of 13Cr steel and having an axial height of 3.5 mm and a radial thickness of 2.35 mm to gas nitriding was used (see FIG. 8(D)).

17Cr steel, of which the top ring was made, is a material having a composition of 0.90% by mass of carbon, 0.40% by mass of silicon, 0.30% by mass of manganese, 17.5% by mass of chromium, 1.10% by mass of molybdenum, 0.12% by mass of vanadium, 0.02% by mass of phosphorus, 0.01% by mass of sulfur, and the balance iron and unavoidable impurities and corresponding to SUS440B of the JIS standard.

10Cr steel, of which the second ring was made, has a composition of 0.50% by mass of carbon, 0.20% by mass of silicon, 0.30% by mass of manganese, 10.2% by mass of chromium, 0.02% by mass of phosphorus, 0.02% by mass of sulfur, and the balance iron and unavoidable impurities.

13Cr steel, of which an oil ring main body was made, is a material having a composition of 0.65% by mass of carbon, 0.38% by mass of silicon, 0.35% by mass of manganese, 13.50% by mass of chromium, 0.3% by mass of molybdenum, 0.01% by mass of phosphorus, 0.01% by mass of sulfur, and the balance iron and unavoidable impurities and corresponding to SUS410 of the JIS standard.

In the oil ring in Example 1, recessed stepped portions were formed at corners of sliding surfaces of outer peripheral sliding projections (on the side facing an outer peripheral groove of the oil ring main body) of a first rail and a second rail constituting the oil ring main body (see FIG. 7(A)), wall surfaces of the recessed stepped portions each included an extending curved surface extending from an arcuate surface toward a side wall of the outer peripheral sliding projection so as to be continuous with the arcuate surface, and an arc center of the arcuate surface was located outside the sliding surface in sliding contact with a cylinder inner wall surface in a radial direction of the oil ring (see FIG. 5(A) or 6). Note that the arcuate surface was formed so as to have a radius of curvature of 0.06 mm. After corners of the sliding surfaces were chamfered using a buff, PVD layers made of CrN were formed at the outer peripheral sliding projections of the oil ring in Example 1, and a final finish was given by lapping.

Table 1 shows a result of a test performed using the oil ring with the above-described conditions of Example 1 to check oil ring properties (friction performance, durability performance, and oil consumption performance). A "friction index" in Table 1 is an indicator of the friction performance of an oil ring and is shown as the relative ratio to friction taken as "1" which was obtained using a conventional equivalent (Comparative Example 1 illustrated below). "Durability" in Table 1 is × when the amount of wear of an outer peripheral sliding projection of an oil ring main body after a test time (of 100 hours) exceeds 2 µm, B when the amount is less than 2 µm, and A when the amount is less than 1 µm. An "oil consumption ratio" in Example 1 is shown as the relative ratio to an oil consumption taken as "1" which was obtained using a conventional equivalent after a test time (of 100 hours) (Comparative Example 1 illustrated below). The result in Table 1 shows that the "friction index" of the oil ring in Example 1 was 0.5, that the "durability" was A, and that the "oil consumption ratio" was 1.

Example 2

In Example 2, the same engine as that in Example 1 was used. The engine was driven under the same drive conditions as those in Example 1 to check how a difference in the shapes of an upper rail and a lower rail of an oil ring main body to be used affects oil ring properties (friction performance, durability performance, and oil consumption performance). Like Example 1, three rings of a top ring, a second ring, and an oil ring were used in combination as piston rings. As the top ring, one obtained by subjecting a ring made of 17Cr steel and having an axial height of 3.5 mm and a radial thickness of 4.6 mm to gas nitriding and subjecting outer peripheral sliding surfaces to (Cr—N) PVD processing was used, as in Example 1. As the second ring, a ring made of 10Cr steel and having an axial height of 2.5 mm and a radial thickness of 4.5 mm was used, as in Example 1. As the oil ring, one obtained by subjecting a ring made of 13Cr steel and having an axial height of 3.5 mm and a radial thickness of 2.35 mm to gas nitriding and grinding the ring was used. That is, the oil ring in Example 2 is different from that in Example 1 in that the oil ring had not been subjected to PVD processing. Note that the compositions of the top ring, second ring, and oil ring used in Example 2 were the same as those in Example 1.

In the oil ring in Example 2, a recessed stepped portion was formed at a corner (on the side facing an outer peripheral groove of the oil ring main body) of a sliding surface of an outer peripheral sliding projection in sliding contact with a cylinder inner wall surface of at least one of a first rail and a second rail constituting the oil ring main body (see FIG. 7(A)), a wall surface of the recessed stepped portion included an extending flat surface extending from an arcuate surface toward the sliding surface of the outer peripheral sliding projection so as to be continuous with the arcuate surface (see FIG. 5(B)). Note that the arcuate surface was formed so as to have a radius of curvature of 0.03 mm. In the outer peripheral sliding projections of the oil ring in Example 2, corners of the sliding surfaces were chamfered using a buff, and a final finish was given by lapping.

Table 1 shows a result of a test performed using the oil ring with the above-described conditions of Example 2 to check oil ring properties (friction performance, durability performance, and oil consumption performance). A "friction index," "durability," and "oil consumption" in Table 1 are as described above in Example 1. The result in Table 1 shows that the "friction index" of the oil ring in Example 2 was 0.5, that the "durability" was B, and that the "oil consumption ratio" was 1.

Example 3

In Example 3, the same engine as that in Example 1 was used. The engine was driven under the same drive conditions as those in Example 1 to check how a difference in the shapes of an upper rail and a lower rail of an oil ring main body to be used affects oil ring properties (friction performance, durability performance, and oil consumption performance). Like Example 1, three rings of a top ring, a second ring, and an oil ring were used in combination as piston rings. As the top ring, one obtained by subjecting a ring made of 17Cr steel and having an axial height of 3.5 mm and a radial thickness of 4.6 mm to gas nitriding and subjecting outer peripheral sliding surfaces to (Cr—N) PVD processing was used, as in Example 1. As the second ring, a ring made of 10Cr steel and having an axial height of 2.5 mm and a radial thickness of 4.5 mm was used, as in Example 1. As the oil ring, one obtained by subjecting a ring made of 13Cr steel and having an axial height of 3.5 mm and a radial thickness of 2.35 mm to gas nitriding, grinding the ring, and subjecting the ring to PVD processing was used (see FIG. 8(D)). Note that the compositions of the top ring, second ring, and oil ring used in Example 3 were the same as those in Example 1.

In the oil ring in Example 3, recessed stepped portions were formed at corners (on the sides of an upper surface and a lower surface of the oil ring main body) of sliding surfaces of outer peripheral sliding projections of a first rail and a second rail constituting the oil ring main body (see FIG. 7(B)), and wall surfaces of the recessed stepped portions each included an extending curved surface extending from an arcuate surface toward a side wall of the outer peripheral sliding projection so as to be continuous with the arcuate surface and each included an extending flat surface extending from the arcuate surface toward the sliding surface of the outer peripheral sliding projection so as to be continuous with the arcuate surface (see FIG. 5(C)). Note that the arcuate surface was formed so as to have a radius of curvature of 0.07 mm. In the outer peripheral sliding projections of the oil ring in Example 3, corners of the sliding surfaces were chamfered using a buff, and a final finish was given by lapping.

Table 1 shows a result of a test performed using the oil ring with the above-described conditions of Example 3 to check oil ring properties (friction performance, durability performance, and oil consumption performance). A "friction index," "durability," and "oil consumption" in Table 1 are as described above in Example 1. The result in Table 1 shows that the "friction index" of the oil ring in Example 3 was 0.5, that the "durability" was A, and that the "oil consumption ratio" was 1.

Example 4

In Example 4, the same engine as that in Example 1 was used. The engine was driven under the same drive conditions as those in Example 1 to check how a difference in the shapes of an upper rail and a lower rail of an oil ring main body to be used affects oil ring properties (friction performance, durability performance, and oil consumption performance). Like Example 1, three rings of a top ring, a second ring, and an oil ring were used in combination as piston rings. As the top ring, one obtained by subjecting a ring made of 17Cr steel and having an axial height of 3.5 mm and a radial thickness of 4.6 mm to gas nitriding and subjecting outer peripheral sliding surfaces to (Cr—N) PVD processing was used, as in Example 1. As the second ring, a ring made of 10Cr steel and having an axial height of 2.5 mm and a radial thickness of 4.5 mm was used, as in Example 1. As the oil ring, one obtained by subjecting a ring made of 13Cr steel and having an axial height of 3.5 mm and a radial thickness of 2.35 mm to gas nitriding, grinding the ring, and subjecting the ring to (Cr—N) PVD processing was used (see FIG. 8(D)). Note that the compositions of the top ring, second ring, and oil ring used in Example 4 were the same as those in Example 1.

In the oil ring in Example 4, a recessed stepped portion was formed at a corner (on the side facing an outer peripheral groove of the oil ring main body) of a sliding surface of an outer peripheral sliding projection in sliding contact with a cylinder inner wall surface of at least one of a first rail and a second rail constituting the oil ring main body (see FIG. 7(A)), a wall surface of the recessed stepped portion included an extending flat surface extending from an arcuate surface toward the sliding surface of the outer peripheral sliding projection so as to be continuous with the arcuate surface (see FIG. 5(B)). Note that the arcuate surface was formed so as to have a radius of curvature of 0.04 mm. In the outer peripheral sliding projections of the oil ring in Example 4, corners of the sliding surfaces were chamfered using a buff, and a final finish was given by lapping.

Table 1 shows a result of a test performed using the oil ring with the above-described conditions of Example 4 to check oil ring properties (friction performance, durability performance, and oil consumption performance). A "friction index," "durability," and "oil consumption ratio" in Table 1 are as described above in Example 1. The result in Table 1 shows that the "friction index" of the oil ring in Example 4 was 0.5, that the "durability" was A, and that the "oil consumption ratio" was 1.

Comparative Example

Comparative Example 1

Comparative Example 1 is used for comparison with the examples. In Comparative Example 1, the same engine as that in Example 1 was used. The engine was driven under the same drive conditions as those in Example 1 to check the amount of oil consumption. Like Example 1, three rings of a top ring, a second ring, and an oil ring having the same shape in cross-section and made of the same material were used in combination as piston rings in Comparative Example 1. As the top ring, one obtained by subjecting a ring made of 17Cr steel and having an axial height of 3.5 mm and a radial thickness of 4.6 mm to gas nitriding and subjecting outer peripheral sliding surfaces to (Cr—N) PVD processing was used, as in Example 1. As the second ring, one obtained by subjecting a ring made of 10Cr steel and having an axial height of 2.5 mm and a radial thickness of 4.5 mm to gas nitriding was used, as in Example 1. As the oil ring, one obtained by subjecting a ring made of 13Cr steel and having an axial height of 3.5 mm and a radial thickness of 2.35 mm to gas nitriding, grinding the ring, and subjecting the ring to (Cr—N) PVD processing was used (see FIG. 8(D)), as in Example 1. Note that the compositions of the top ring, second ring, and oil ring used in Comparative Example 1 were the same as those in Example 1.

The oil ring used in Comparative Example 1 corresponds to a conventional product having no recessed stepped portion formed at corners of sliding surfaces of outer peripheral sliding projections in sliding contact with a cylinder inner wall surface of a first rail and a second rail constituting an oil ring main body in the shape in vertical cross-section along a sliding direction of the first rail and second rail. Note that, in the outer peripheral sliding projections of the oil ring in Comparative Example 1, corners of the sliding surfaces were chamfered using a buff, and a final finish was given by lapping.

Table 1 shows a result of a test performed using the oil ring with the above-described conditions of Comparative Example 1 to check oil ring properties (friction performance, durability performance, and oil consumption performance), together with the results in the examples. A "friction index," "durability," and "oil consumption ratio" in Table 1 are as described above in Example 1. The result in Table 1 shows that the "friction index" of the oil ring in Comparative Example 1 was 1.0, that the "durability" was A, and that the "oil consumption ratio" was 1.

Comparison of Examples with Comparative Example

Comparison of Examples with Comparative Example: Table 1 below shows the results of the tests performed to check oil ring properties (friction performance, durability performance, and oil consumption performance) for Examples 1 to 4 and Comparative Example 1, which were different in the shapes of an upper rail and a lower rail of an oil ring main body to be used.

TABLE 1

|  | Friction index | Durability | Oil consumption ratio |
|---|---|---|---|
| Example 1 | 0.5 | A | 1 |
| Example 2 | 0.5 | B | 1 |
| Example 3 | 0.5 | A | 1 |
| Example 4 | 0.5 | A | 1 |
| Comparative Example 1 | 1.0 | A | 1 |

As can be seen from Table 1, Examples 1 to 4 and Comparative Example 1, which were different in the shapes of an upper rail and a lower rail of an oil ring main body to be used, all had the same value of "1" for "oil consumption ratio." That is, the results of the actual machine tests using the diesel engine at full load (WOT) for 100 hours show that differences in the shape of and surface treatment conditions for an oil ring among Examples 1 to 4 and Comparative Example 1 did not make differences in oil consumption. The results in Table 1 show that Example 1, Example 3, Example 4, and Comparative Example 1, in which an upper rail and a lower rail of an oil ring main body to be used had been subjected to gas nitriding, ground, and then subjected to PVD processing were superior in "durability" to Example 2, in which an upper rail and a lower rail of an oil ring main body to be used had only been subjected to gas nitriding and ground. The results in Table 1 also show that Comparative Example 1 had a value of "1.0" for "friction index" while Examples 1 to 4 had a value of "0.5" and that use of any one of the oil rings in Examples 1 to 4 was superior in friction performance to use of the oil ring in Comparative Example 1. The above-described results have corroborated that the oil rings in Examples 1 to 4 are superior in the total balance among friction performance, durability performance, and oil consumption performance that are oil ring properties to the oil ring in Comparative Example 1 that is a conventional equivalent.

The foregoing has shown that forming an oil ring main body of an internal combustion engine oil ring so as to have a shape satisfying the conditions specified in the present invention allows inhibition of variation in pressing force of the oil ring against a cylinder inner wall surface, which ensures long-term stable reduction in the amount of oil consumption and achieves improvement in fuel efficiency.

As has been described above, in an internal combustion engine oil ring according to the present invention, a recessed stepped portion is formed at a corner of a sliding surface of an outer peripheral sliding projection in sliding contact with a cylinder inner wall surface of at least one of a first rail and a second rail constituting an oil ring main body in the shape in vertical cross-section along a sliding direction of the rails, and a wall surface of the recessed stepped portion has an arcuate surface having a radius of curvature of 0.02 mm to 0.08 mm. This allows long-term stable reduction in the amount of oil consumption.

INDUSTRIAL APPLICABILITY

An internal combustion engine oil ring according to the present invention is applicable to any type of internal combustion engine. Use of the oil ring allows reduction in the amount of oil consumption when an internal combustion engine is driven and improvement in the wear resistive performance of the oil ring itself. When an oil ring main body according to the present invention is to be formed, the shapes of an upper rail and a lower rail can be formed at low cost with high accuracy. Accordingly, use of an internal combustion engine oil ring according to the present invention in an internal combustion engine for an automobile allows provision of a high-quality oil ring at low cost, which is desirable.

[Reference Signs List]

| | |
|---|---|
| 1 | internal combustion engine oil ring |
| 2 | oil ring main body |
| 2a | joint |
| 2b | recessed stepped portion having a circular arc shape |
| 2c | outer peripheral groove |
| 2d | generally semicircular recess |
| 3 | coil expander |
| 4 | web |
| 5 | first rail |
| 6 | second rail |
| 7 | oil return hole |
| 8 | outer peripheral sliding surface (on the first rail side) |
| 9 | outer peripheral sliding surface (on the second rail side) |
| 10 | piston |
| 11 | oil ring groove |
| 12 | oil drain hole |
| 20 | cylinder |
| 21 | cylinder inner wall surface |
| R | radius of curvature of circular arc shape |
| L | oil ring main body axial length of rail sliding surface |

The invention claimed is:

1. An internal combustion engine oil ring, comprising:
a substantially ring-shaped oil ring main body with a radially inward concave recess on an inner peripheral side and an outer peripheral surface side that slides on a circular cylinder inner wall; and
a coil expander arranged in the recess on the inner peripheral side of the oil ring main body, the coil expander for pressing the oil ring main body against the circular cylinder inner wall,
wherein the oil ring main body includes a i) web comprising an upper end and a lower end, ii) an upper, first rail, and iii) a lower, second rail,
the web having a plurality of oil return holes to allow oil scraped from a surface of the cylinder inner wall to flow down to an underside of a piston, the oil return holes penetrating through the web in a radial direction, the oil return holes arranged in a circumferential direction of the web,
the upper end of the web being connected to a lower surface of the first rail located on an upper side of the web, the lower end of the web being connected to an upper surface of the second rail,
wherein the first rail, the web, and the second rail are integral with each other,
the first rail, second rail, and the web together defining, as seen in cross-section of the oil ring main body, a radially outwardly concave outer peripheral groove,
the first and second rails providing a plurality of recessed stepped portions,
a first one of the recessed stepped portions being formed at a corner of a sliding surface of an outer peripheral sliding projection in sliding contact with the cylinder inner wall surface, of the first rail,
a second one of the recessed stepped portions being formed at a corner of a sliding surface of an outer peripheral sliding projection in sliding contact with the cylinder inner wall surface, of the second rail,
in vertical cross-section of the first rail and the second rail, each of the first and second recessed stepped portions reducing a thickness of the respective sliding surface,
a wall surface of each of the first and second recessed stepped portions has a concave arcuate surface extending toward an outer diameter of the ring and having a radius of curvature of 0.02 mm to 0.08 mm,
the concave arcuate surface of the first rail and the concave arcuate surface of the second rail face each other, and
the outer peripheral sliding projection of the first rail is symmetrical to the outer peripheral sliding projection of the second rail with respect to a radial axis of the web,
wherein the wall surface of each of the recessed stepped portions is continuously formed of the concave arcuate surface and a curved surface without a planar surface therebetween, the curved surface being successionally formed between the concave arcuate surface and an inner side wall of the outer peripheral sliding projection, the inner side wall of the outer peripheral sliding projection of the first rail and the inner side wall of the outer peripheral sliding projection of the second rail facing each other.

2. The internal combustion engine oil ring according to claim 1, wherein the first and second recessed step portions are chamfered corners adjacent the sliding surface of the outer peripheral sliding projection in sliding contact with the cylinder inner wall surface.

3. The internal combustion engine oil ring according to claim 1, wherein an axial length of the sliding surface of each outer peripheral sliding projection in sliding contact with the cylinder inner wall surface is 0.02 mm to 0.18 mm.

4. The internal combustion engine oil ring according to claim 1, wherein the oil ring main body is made of stainless steel or steel and includes, as a hard layer, one or two or more selected from among the group consisting of a nitrided layer, a physical vapor deposition (PVD) layer, and a diamond-like carbon (DLC) layer at least at each sliding surface of the outer peripheral sliding projection in sliding contact with the cylinder inner wall surface.

5. A method for manufacturing an internal combustion engine oil ring according to claim 1, comprising the following steps in order:
nitriding at least each outer peripheral sliding surface of the oil ring main body made of stainless steel or steel constituting the oil ring; and
grinding a portion in a circumferential direction of each outer peripheral sliding surface of the oil ring main body and forming a recessed stepped portion at a corner of each sliding surface.

6. The method for manufacturing the internal combustion engine oil ring, according to claim 5, further comprising, after the grinding, forming a physical vapor deposition (PVD) layer and/or a diamond-like carbon (DLC) layer at least at each sliding surface in sliding contact with a cylinder inner wall surface of the oil ring main body.

7. The internal combustion engine oil ring according to claim 1, wherein the wall surface of each of the recessed stepped portions includes an extending flat surface extending from the concave arcuate surface toward the sliding surface of the outer peripheral sliding projection so as to be continuous with the concave arcuate surface.

8. The internal combustion engine oil ring according to claim 1, wherein an arc center of each concave arcuate surface is located at a position further outside than each sliding surface in an oil ring radial direction.

9. An internal combustion engine oil ring, comprising:
a substantially ring-shaped oil ring main body with a radially inward concave recess on an inner peripheral side and an outer peripheral surface side that slides on a circular cylinder inner wall; and
a coil expander arranged in the recess on the inner peripheral side of the oil ring main body, the coil expander for pressing the oil ring main body against the circular cylinder inner wall,
wherein the oil ring main body includes a i) web comprising an upper end and a lower end, ii) an upper, first rail, and iii) a lower, second rail,
the web having a plurality of oil return holes to allow oil scraped from a surface of the cylinder inner wall to flow down to an underside of a piston, the oil return holes penetrating through the web in a radial direction, the oil return holes arranged in a circumferential direction of the web,
the upper end of the web being connected to a lower surface of the first rail located on an upper side of the web, the lower end of the web being connected to an upper surface of the second rail,
wherein the first rail, the web, and the second rail are integral with each other,
the first rail, second rail, and the web together defining, as seen in cross-section of the oil ring main body, a radially outwardly concave outer peripheral groove,
the first and second rails providing a plurality of recessed stepped portions,
a first one of the recessed stepped portions being formed at a corner of a sliding surface of an outer peripheral sliding projection in sliding contact with the cylinder inner wall surface, of the first rail,
a second one of the recessed stepped portions being formed at a corner of a sliding surface of an outer peripheral sliding projection in sliding contact with the cylinder inner wall surface, of the second rail,
in vertical cross-section of the first rail and the second rail, each of the first and second recessed stepped portions reducing a thickness of the respective sliding surface,
a wall surface of each of the first and second recessed stepped portions has a concave arcuate surface extending toward an outer diameter of the ring and having a radius of curvature of 0.02 mm to 0.08 mm,
the concave arcuate surface of the first rail and the concave arcuate surface of the second rail face each other, and
the outer peripheral sliding projection of the first rail is symmetrical to the outer peripheral sliding projection of the second rail with respect to a radial axis of the web,
wherein the wall surface of each of the recessed stepped portions is formed in order with a first convex surface, the concave arcuate surface, a flat surface, and a second convex surface, the flat surface and the second convex surface being successively formed between the concave arcuate surface and the sliding surface of the outer peripheral sliding projection, the flat surface of the outer peripheral sliding projection of the first rail and the flat surface of the outer peripheral sliding projection of the second rail facing each other.

10. The internal combustion engine oil ring according to claim 9, wherein the first and second recessed step portions are chamfered corners adjacent the sliding surface of the outer peripheral sliding projection in sliding contact with the cylinder inner wall surface.

11. The internal combustion engine oil ring according to claim 9, wherein an axial length of the sliding surface of each outer peripheral sliding projection in sliding contact with the cylinder inner wall surface is 0.02 mm to 0.18 mm.

12. The internal combustion engine oil ring according to claim 9, wherein the oil ring main body is made of stainless steel or steel and includes, as a hard layer, one or two or more selected from among the group consisting of a nitrided layer, a physical vapor deposition (PVD) layer, and a diamond-like carbon (DLC) layer at least at each sliding surface of the outer peripheral sliding projection in sliding contact with the cylinder inner wall surface.

13. A method for manufacturing an internal combustion engine oil ring according to claim 9, comprising the following steps in order:
nitriding at least each outer peripheral sliding surface of the oil ring main body made of stainless steel or steel constituting the oil ring; and
grinding a portion in a circumferential direction of each outer peripheral sliding surface of the oil ring main body and forming a recessed stepped portion at a corner of each sliding surface.

14. The method for manufacturing the internal combustion engine oil ring, according to claim 13, further comprising, after the grinding, forming a physical vapor deposition (PVD) layer and/or a diamond-like carbon (DLC) layer at least at each sliding surface in sliding contact with a cylinder inner wall surface of the oil ring main body.

15. An internal combustion engine oil ring, comprising:
a substantially ring-shaped oil ring main body with a radially inward concave recess on an inner peripheral side and an outer peripheral surface side that slides on a circular cylinder inner wall; and
a coil expander arranged in the recess on the inner peripheral side of the oil ring main body, the coil expander for pressing the oil ring main body against the circular cylinder inner wall,
wherein the oil ring main body includes a i) web comprising an upper end and a lower end, ii) an upper, first rail, and iii) a lower, second rail,
the web having a plurality of oil return holes to allow oil scraped from a surface of the cylinder inner wall to flow down to an underside of a piston, the oil return holes penetrating through the web in a radial direction, the oil return holes arranged in a circumferential direction of the web,
the upper end of the web being connected to a lower surface of the first rail located on an upper side of the web, the lower end of the web being connected to an upper surface of the second rail,
wherein the first rail, the web, and the second rail are integral with each other,
the first rail, second rail, and the web together defining, as seen in cross-section of the oil ring main body, a radially outwardly concave outer peripheral groove,
the first and second rails providing a plurality of recessed stepped portions,
a first one of the recessed stepped portions being formed at a corner of a sliding surface of an outer peripheral sliding projection in sliding contact with the cylinder inner wall surface, of the first rail,
a second one of the recessed stepped portions being formed at a corner of a sliding surface of an outer peripheral sliding projection in sliding contact with the cylinder inner wall surface, of the second rail,
in vertical cross-section of the first rail and the second rail, each of the first and second recessed stepped portions reducing a thickness of the respective sliding surface, a wall surface of each of the first and second recessed stepped portions has a concave arcuate surface extending toward an outer diameter of the ring and having a radius of curvature of 0.02 mm to 0.08 mm, the concave arcuate surface of the first rail and the concave arcuate surface of the second rail face each other, and the outer peripheral sliding projection of the first rail is symmetrical to the outer peripheral sliding projection of the second rail with respect to a radial axis of the web, wherein an arc center of each of the concave arcuate surfaces is located at a position further outside than each sliding surface in an oil ring radial direction, wherein the recessed stepped portions including the concave arcuate surfaces are formed without a planar surface.

16. The internal combustion engine oil ring according to claim 15, wherein the first and second recessed step portions are chamfered corners adjacent the sliding surface of the outer peripheral sliding projection in sliding contact with the cylinder inner wall surface.

17. The internal combustion engine oil ring according to claim 15, wherein an axial length of the sliding surface of each outer peripheral sliding projection in sliding contact with the cylinder inner wall surface is 0.02 mm to 0.18 mm.

18. The internal combustion engine oil ring according to claim 15, wherein the oil ring main body is made of stainless steel or steel and includes, as a hard layer, one or two or more selected from among the group consisting of a nitrided layer, a physical vapor deposition (PVD) layer, and a diamond-like carbon (DLC) layer at least at each sliding surface of the outer peripheral sliding projection in sliding contact with the cylinder inner wall surface.

19. A method for manufacturing an internal combustion engine oil ring according to claim 15, comprising the following steps in order:

nitriding at least each outer peripheral sliding surface of the oil ring main body made of stainless steel or steel constituting the oil ring; and grinding a portion in a circumferential direction of each outer peripheral sliding surface of the oil ring main body and forming a recessed stepped portion at a corner of each sliding surface.

20. The method for manufacturing the internal combustion engine oil ring, according to claim 19, further comprising, after the grinding, forming a physical vapor deposition (PVD) layer and/or a diamond-like carbon (DLC) layer at least at each sliding surface in sliding contact with a cylinder inner wall surface of the oil ring main body.

* * * * *